(12) United States Patent
Fang

(10) Patent No.: US 11,851,576 B2
(45) Date of Patent: Dec. 26, 2023

(54) LOW-ABSORPTION WATER REPELLENT COATING COMPOSITION FOR WINDSHIELD WIPER BLADE INSERT

(71) Applicant: Illinois Tool Works Inc., Glenview, IL (US)

(72) Inventor: Jiafu Fang, Glenview, IL (US)

(73) Assignee: Illinois Tool Works Inc., Glenview, IL (US)

(*) Notice: Subject to any disclaimer, the term of this patent is extended or adjusted under 35 U.S.C. 154(b) by 260 days.

(21) Appl. No.: 17/598,535

(22) PCT Filed: May 15, 2020

(86) PCT No.: PCT/US2020/033036
§ 371 (c)(1),
(2) Date: Sep. 27, 2021

(87) PCT Pub. No.: WO2020/232323
PCT Pub. Date: Nov. 19, 2020

(65) Prior Publication Data
US 2022/0195204 A1 Jun. 23, 2022

Related U.S. Application Data

(60) Provisional application No. 62/848,249, filed on May 15, 2019.

(51) Int. Cl.
*C09D 5/00* (2006.01)
*C09D 7/61* (2018.01)
(Continued)

(52) U.S. Cl.
CPC .................. *C09D 5/00* (2013.01); *B60S 1/38* (2013.01); *C09D 7/20* (2018.01); *C09D 7/61* (2018.01);
(Continued)

(58) Field of Classification Search
CPC ... C09D 5/00; C09D 7/61; C09D 7/20; C09D 7/63; B60S 1/38; B60S 2001/3829; C08K 3/04; C08K 5/544
See application file for complete search history.

(56) References Cited

U.S. PATENT DOCUMENTS 6,461,537 B1 10/2002 Turcotte et al.
6,994,890 B2 2/2006 Ohlhausen et al.
(Continued)

FOREIGN PATENT DOCUMENTS

CN 1874855 A 12/2006
CN 103025520 A 4/2013
(Continued)

OTHER PUBLICATIONS

First Office Action issued in CN 202080032840.X, dated Aug. 18, 2022.
(Continued)

*Primary Examiner* — Sharidan Carrillo
(74) *Attorney, Agent, or Firm* — MaxGoLaw PLLC

(57) ABSTRACT

A coating composition for imparting a hydrophobic film on a target surface is provided that includes a quaternary ammonium silane salt, a solvent, and a solid lubricant. The composition is stable and able to impart a hydrophobic film even after storage for several weeks at elevated temperature. The composition is non-absorbable or non-penetrative into an elastomeric applicator onto which the water repellant (WR) coating is applied, preserving the capability of transferring the WR ingredients of the coating from the wiper blade insert to a windshield on which the wiper blade insert is operated, even after the coated wiper blade insert has been aged for an extended period of time in storage. A wiper blade insert is also provided having the above composition applied and instructions for the securement of the wiper blade to a (Continued)

vehicle to impart the hydrophobic film to a vehicle windshield contacted by the wiper blade insert.

9 Claims, 4 Drawing Sheets

(51) Int. Cl.
*C09D 7/20* (2018.01)
*C09D 7/63* (2018.01)
*B60S 1/38* (2006.01)
*C08K 3/04* (2006.01)
*C08K 5/544* (2006.01)

(52) U.S. Cl.
CPC ......... *C09D 7/63* (2018.01); *B60S 2001/3829* (2013.01); *C08K 3/04* (2013.01); *C08K 5/544* (2013.01)

(56) References Cited

U.S. PATENT DOCUMENTS

| | | | |
|---|---|---|---|
| 9,637,670 | B2 | 5/2017 | Fang |
| 2005/0096250 | A1 | 5/2005 | Ohlhausen et al. |
| 2009/0047475 | A1 | 2/2009 | Jeon |
| 2013/0017242 | A1 | 1/2013 | Richardson et al. |
| 2013/0045332 | A1 | 2/2013 | Fang et al. |
| 2014/0116465 | A1 | 5/2014 | Fang |
| 2019/0061401 | A1 | 2/2019 | Ozawa |

FOREIGN PATENT DOCUMENTS

| | | | |
|---|---|---|---|
| CN | 104769088 A | 7/2015 | |
| CN | 105925388 A | 9/2016 | |
| CN | 107057101 A | 8/2017 | |
| CN | 107099400 A | 8/2017 | |
| CN | 108024602 A | 5/2018 | |
| EP | 1059213 A2 | 12/2000 | |
| JP | 2003180592 A | 7/2003 | |
| JP | 2014046734 A | 3/2014 | |
| TW | 446654 B | 7/2001 | |
| WO | WO-2007070714 A2 * | 6/2007 | ............... C09G 1/08 |
| WO | WO-2008076839 A2 * | 6/2008 | ............. A01N 55/00 |

OTHER PUBLICATIONS

Zhou, et al., "Troubleshooting Problem Solving of Textile Sizing", China National Textile Press, Aug. 31, 2005, p. 17 (A type reference).

Int'l Search Report for PCT/US2020/033036, dated Aug. 19, 2020.

\* cited by examiner

LOW-ABSORPTION WATER REPELLENT COATING COMPOSITION FOR WINDSHIELD WIPER BLADE INSERT

RELATED APPLICATIONS

This application claims priority benefit of U.S. Provisional Application Ser. No. 62/848,249 filed 15 May 2019, the contents of which are hereby incorporated by reference.

FIELD OF THE INVENTION

The present invention in general relates to a hydrophobic coating composition for wiper blades imparting a hydrophobic film to a contacted window glass through wiper usage, and in particular to a hydrophobic coating composition that resists absorption into the wiper blade insert surface.

BACKGROUND OF THE INVENTION

Rain, sleet, and snow have always presented a vision problem for the operator of a vehicle. While mechanical movement of a wiper blade insert across a windshield is partly effective as a mechanical squeegee to displace water and snow from a windshield, the operation of a conventional wiper blade, regardless of whether made of organic elastomers or silicone rubbers, is only partially effective in clearing water and snow from a windshield. A wiper blade insert moving across a windshield leaves a thin film of water that partly impairs vision and promotes adhesion of additional liquid water or snow to the windshield. Additionally, as a wiper blade insert undergoes degradation through exposure to the environment, the uniformity of wiper blade insert contact with the windshield is degraded. These problems are compounded by debris that commonly adhere to the windshield and create regions in which the wiper blade insert is gapped from the windshield surface leading to vision obscuring streaks and water droplets.

To address limitations of windshield cleaning through mechanical squeegee action, hydrophobic glass treatment solutions have been applied to vehicle windshields to improve driver vision under high humidity conditions of rain, sleet, or snow. Representative of such glass treatments are those detailed in U.S. Pat. Nos. 3,579,540, 5,688,864, 6,432,181. While such glass treatments are effective in rendering the windshield hydrophobic so as to cause water to bead and not form windshield water film, these products have met with limited acceptance owing to the labor-intensive application, and somewhat toxic chemicals needed to be handled to create a hydrophobic windshield surface. Additionally, the application of such hydrophobic glass treatments while a windshield is being subjected to rain or other precipitation is impractical.

In recognition of the limitations of conventional hydrophobic glass treatments, coating compositions have been developed for a wiper blade insert that include a silicone wax, a silicone oil in a solid lubricant where the wax dissolves in the silicone oil, such that during operation of the wiper blade components of the coating layer are imparted onto a contacting windshield through the friction of the wiper blade insert against the windshield. Such a composition is detailed in U.S. Pat. No. 8,258,219. While such a coated wiper blade insert is effective in delivering a hydrophobic coating to a windshield upon wiper blade insert installation, the ability of the coating to be transferred to the windshield is rapidly degraded to the point where the ability to transfer coating components to a windshield is reduced in the time between wiper production and the actual installation of the blade on a vehicle. Additionally, the coatings imparted to a windshield tend to be irregular and impart a mottled hydrophobicity to the windshield surface.

U.S. Pat. No. 9,540,552 to the assignee of this application and incorporated herein by reference in its entirety teaches a coating composition for imparting a hydrophobic film on a target surface that includes an oil of a silicone oil or a fluoropolymer oil or a combination thereof, a resin, and a dry lubricant. A solvent is present to form a solution of the oil and resin. A coating is imparted to an applicator that in turn can transfer the coating as a hydrophobic film to glass. The coating composition is stable and able to impart hydrophobic film even after storage for several weeks at elevated temperature. The coating composition does so through the exclusion of synthetic waxes especially including silicone waxes. A kit is also provided that includes a wiper blade insert having the above coating composition applied along with instructions for the securement of the wiper blade insert to a vehicle to impart the hydrophobic film to a vehicle windshield contacted by the wiper blade.

It has been observed that typical hydrophobic glass treatments only last for a few months on the automotive windshield surface, primarily due to the abrasion by the wiper blade insert if the blade squeegee is made of non-silicone rubber. However, appropriately formulated polysiloxane fluid-based water repellent (WR) coating or treatment for automotive windshield surfaces resist the wiper blade insert abrasion if the wiper blade insert is composed of silicone rubber. As illustrated by the prior art chart shown in FIG. 1, a synergy exists between water repellant (WR) coatings and the wiper blade material to which the coating is applied. The contact angle (CA) of water on windshield glass so coated remains above ninety degrees for more than 100,000 wiper blade abrasion cycles when the WR coating is applied to a silicone based wiper blade. However, when the WR coating is applied to a non-silicone blade, the contact angle falls below sixty degrees at approximately 20,000 wiper blade abrasion cycles, which is considered the minimum effective contact angle. Clearly, there is a strong synergy between the WR coating and silicone rubber squeegee.

Unfortunately, if a conventional, polysiloxane fluid-based WR coating is pre-applied directly onto the silicone rubber squeegee surface such as the teaching of U.S. Pat. No. 9,540,552, the water repelling component in the WR coating overtime is absorbed rather quickly into the silicone rubber, losing its ability to transfer the water repelling material of the coating composition to the wiped windshield surface to make it hydrophobic.

Thus, there exists a need for a wiper blade coating that has a long-lasting shelf life after application to the wiper blade insert as to allow the coated wiper blade insert to impart a hydrophobic film to the contacted areas of the windshield rapidly during wiper blade operation and even after a long storage duration of the wiper blade coated with the coating composition, and even at elevated temperature. There further exists a need for a water repellent coating that resists absorption into silicon rubber based wiper blade materials.

SUMMARY OF THE INVENTION

A coating composition is provided for imparting water repellency from a rubber element of automotive wiper blade to a windshield, the coating includes a quaternary ammonium chloride silane, a polar solvent such as isopropanol, or non-polar solvent such as a mineral spirits in which the silane is dispersible, and a graphite powder.

An improved coating composition is provided for imparting a hydrophobic film, the coating composition including a quaternary ammonium chloride silane, a polar solvent such as isopropanol, or non-polar solvent such as a mineral spirits in which the silane is dispersible, and a graphite powder wherein the improvement lies in: the silane, which carries an electric charge on the molecule and is repelled by the rubber element of the wiper blade, preventing the coating composition from being absorbed into the rubber element.

A kit is provided for producing a hydrophobic film on a surface, the kit includes an applicator having an applicator surface and a nonvolatile layer formed from the a composition as described above, the nonvolatile layer adhered to the applicator surface or applied thereto from a container; and instructions for contacting the applicator surface with the windshield surface to produce a hydrophobic film having a water contact angle of greater than or equal to 60°.

A process of activating a windshield includes contacting the windshield with a wiper blade coated with a composition as described above, and wiping under wet, dry, or a combination of wet and dry conditions within 2000 wipe cycles to a water repellency of more than 60 degrees of water contact angle to activate the windshield.

BRIEF DESCRIPTION OF THE DRAWINGS

The present invention is further detailed with respect to the following drawings. These figures are not intended to limit the scope of the present invention but rather illustrate certain attributes thereof.

DESCRIPTION OF THE INVENTION

Figure 1:
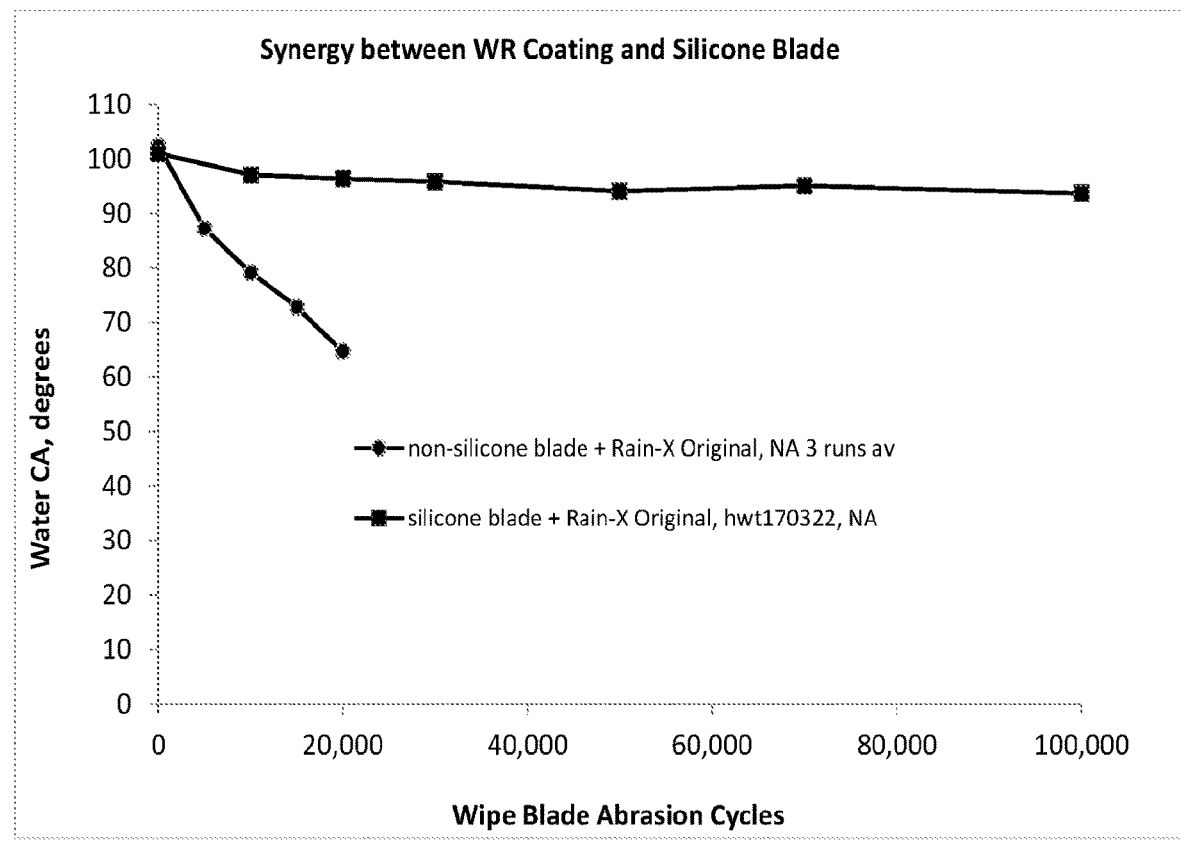
FIG. 1 is a plot of water contact angle in degrees as a function of wiper blade wipe cycles on automotive windshield glass to show the synergy effect between a selected silicone wiper blade and Rain-X® Rain Repellent.

The present invention has utility as a vehicle windshield wiper having a coating that resists absorption into silicone based wiper blade insert materials while also imparting a hydrophobic film to the contacted glass surface. Embodiments of the inventive water repellent (WR) coating composition are non-absorbable into, or otherwise not penetrative into the wiper blade insert onto which the inventive WR coating is applied, therefore, preserving its capability of transferring the WR ingredients of the coating from the wiper blade insert to the windshield surface on which the wiper blade insert is operated, even after the coated wiper blade insert has been aged for an extended period of time in storage. The performance of aged wiper blades is an important parameter to measure as a wiper blade insert following manufacturing can take from several weeks to many months before reaching the end user and contact with target windshield glass. The present invention achieves this result by formulating the water repelling component in the WR coating composition to be non-absorbable into, or otherwise not penetrative into the wiper blade insert coated therewith.

In embodiments of the inventive water repellant coating, the active ingredients of the coating composition are non-absorbable to the coated wiper blade insert substrate, and display a minimal affinity between the WR component and the rubber surface that is coated. As a result, the water repelling component in the WR coating is not absorbed into the wiper blade insert prior to installation, thereby preventing the loss of the ability of the composition to transfer the water repelling material of the coating to the wiped glass windshield surface to render the glass hydrophobic.

While the coating composition of the present invention is largely detailed hereafter with respect to a wiper blade insert formed of silicone, it is appreciated that the inventive coating also provides excellent performance on various non-silicone rubber materials commonly used in the wiper blade industry. These other materials including but not limited to, natural rubber, synthetic rubber such as CR rubber (chloroprene rubber), EPDM (ethylene propylene diene terpolymer) rubber, mixtures of natural and synthetic rubbers, silicone rubber, and mixtures of silicone rubber and non-silicone rubber.

It is further appreciated that while the coating composition of the present invention is largely detailed with respect to windshields, it is appreciated that other suitable target surfaces of usage for the present invention illustratively include buffing pads, buffing clothes, chamois, manual squeegees, vehicle rear windows, aircraft exterior surfaces, and other exterior surfaces where water repellency is desired. The term "wiper blade" as used herein is intended to encompass these aforementioned applicators as well. The present invention has the attribute of long term storage stability of more than 6 months at the ambient condition coupled with the ability to even after storage, impart a hydrophobic film to a contacted surface.

Numerical ranges cited herein are intended to recite not only the end values of such ranges but the individual values encompassed within the range and varying in single units of the last significant figure. By way of example, a range of from 0.1 to 1.0 in arbitrary units according to the present invention also encompasses 0.2, 0.3, 0.4, 0.5, 0.6, 0.7, 0.8, and 0.9; each independently as lower and upper bounding values for the range.

An inventive coating composition includes a film-forming, quaternary ammonium silicone compound having the formulas:

$$[(RO)_{3-a}Si-R^2-N(R^1)(R^1)(R^3)]X^- \qquad (I), \text{ or}$$

$$(HO)_2-Si(R^4)-O-(R^4)Si-(OH)_2 \qquad (II)$$

where R in each occurrence is independently $C_1$-$C_4$ alkyl, $R^4$, or H; a is an integer value of 0, 1, or 2, inclusive; $R^1$ and $R^2$ in each occurrence are independently $C_1$-$C_8$ alkyl or alkenyl groups; $R^3$ is a $C_1$-$C_{22}$ alkyl group; and X represents an anion, and includes $F^-$, $Cl^-$, $Br^-$, $I^-$, divalent and trivalent anions with the proviso that a salt is formed with the quaternary ammonium cation; and $R^4$ in each occurrence is $N(R^1)(R^1)(R^3)$] $X^-$. It is appreciated that any alkyl or alkenyl moieties present in formula (I) can be linear or branched. It is further appreciated that any alkyl group having of at least C3 can further include a pendant group that serves to modify the solubility and filming forming properties. Pendant groups operative herein illustratively include —OH, —$SO_4^{-2}$, or —$SO_3^-$.

Exemplary quaternary ammonium silicones operative herein illustratively include: $(CH_3O)_3Si(CH_2)_3N+(CH_3)_2C_{18}H_{37}Cl-$, $(CH3CH2O)3Si(CH2)3N+(CH3)2C18H37Cl-$, $(CH3O)3Si(CH2)3N+(CH3)2C18H37Br-$, $(CH3O)3Si(CH2)3N+(C10H21)2CH3Cl-$, $(CH3O)3Si(CH2)3N+(CH3)2C14H29Cl-$, $(CH3O)3Si(CH2)3N+(CH3)2C14H29Br-$, $(CH3O)3Si(CH2)3N+(CH3)2C16H23Cl-$, and combinations thereof.

The film-forming, quaternary ammonium silicone salt is present in some inventive embodiments from 0.5 to 75 total weight percent, in other inventive embodiments, the salt is present from 5 to 60 total weight percent.

A solvent or a combination of solvents capable of forming a solution with the salt is also provided. The solvents operative herein illustratively include polar or non-polar or mixture of polar or non-polar solvents suitable for dissolution of the salt that illustratively include methylethylketone, $C_1$-$C_8$ alkyl lactates, $C_1$-$C_8$ alkyl acetates, $C_1$-$C_8$ alcohols, glycols, glymes, polyalkyl glycols, ethers as well as combinations thereof. It is appreciated that the term "alkyl" as used herein is intended to include linear, branched, and cyclic forms thereof. In certain inventive embodiments, the solvent is the alcohol, of which isopropanol is exemplary. The nature of the solvent as operative herein is largely limited only to the ability to dissolve the silicone oil and the resin components. As will be made clear from the following description, as the inventive composition is applied to an applicator in certain inventive embodiments.

An inventive coating composition also includes an optional particulate lubricant. A particulate lubricant according to the present invention is either applied separately to an applicator or as a colloidal dispersion in the solvent along with the salt. The particulate lubricant in certain embodiments of the present invention has greater than 90 particle number percent of the particulate having a particle size smaller than 100 microns as determined by size guide number-(SGN). In still other embodiments of the present invention, 100 particle number percent are smaller than 100 microns. In still other embodiments of the present invention, the particulate has a mean particle size smaller than 50 microns. In certain embodiments of the present invention, a coating composition in solvated form is 1 to 10 total weight percent particulate lubricant. A particulate lubricant operative in the present invention illustratively includes graphite, turbostratic carbon, boron nitride, boric acid, and combinations thereof. In some inventive embodiments the particulate lubricant is only graphite.

In some inventive embodiments, an optional nonpolar hydrocarbon solvent such as mineral spirits are present. Mineral spirits, if present facilitates spreading on a hydrophobic applicator surface, such as a wiper blade. An inventive coating composition has superior storage stability as a nonvolatile layer on an applicator such as a wiper blade insert through the inclusion of the quaternary ammonium silicone salt to preclude penetration into the applicator. An inventive coating composition is applied to an applicator such as a wiper blade, cloth, or buffing pad and allowed to dry to a nonvolatile layer on the applicator. A layer of the inventive formulation on an applicator is amenable to storage for weeks or months even at extreme temperatures within the range of −50 to 70° C. and yet is still able to impart a hydrophobic film to a contacted glass surface. The resultant film imparts to the surface a water contact angle of at least 60° through simply rubbing the applicator against the target surface.

Figure 4:
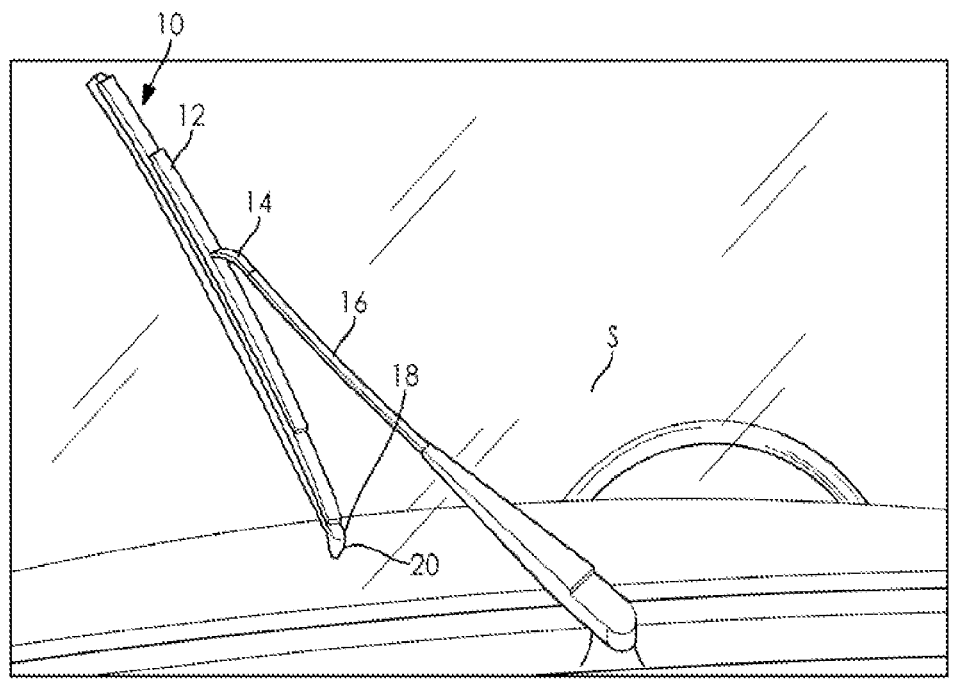
FIG. 4 is an image of wiper blade in the context of a windshield glass.

An applicator such as a wiper blade, shown generally at 10 in FIG. 4. The wiper blade 10 is in contact with a substrate, S such as a windshield. The wiper blade 10 has a blade 12 coupled to an arm 16 by way an intermediate articulation 14. The blade 12 supports a hydrophobic elastomeric wiper blade insert 18 having an inventive composition therein in the form of a coating layer 20. The coating 20 formed by allowing an inventive formulation to dry in contact with one or more sides of a lip of the wiper blade insert 18.

Without intending to be bound to a particular theory, it is believed that cationic quaternary ammonium silicone salt with an inherent charge is hydrophilic at least on the part of the molecule that is close to the electric charge and repelled consequently by a hydrophobic applicator, such as an elastomeric wiper blade. As a result, the inventive formulation coating is prevented from being absorbed into the applicator interior and therefore extending the shelf life of the WR coating.

The present invention also provides a kit for producing a hydrophobic film on a surface. The kit includes an applicator having a nonvolatile layer of the coating composition adhered to the applicator, or the coating composition in a separate bottle for user application to the applicator; along with instructions for contacting the coated applicator with the target surface to produce a hydrophobic film on the surface with a water droplet contact angle of greater than 60° with the contact angle being measured by ASTM C813. The kit in order to have a storage stability of greater than three months, and in certain embodiments more than one year, and still in certain embodiments equal to or more than two years at an average of 25° C.

A process for activating a windshield with a wiper blade insert as an applicator according to certain embodiments of the present invention is achieved by wiping the windshield under wet, dry, or a combination of wet and dry conditions to a water repellency of more than 60 degrees of water contact angle within 2000 wipe cycles. In still other embodiments, this degree of water repellency is achieved while maintaining a wipe quality that is within 90% or greater of that for an uncoated wipe blade otherwise identical to the wiper blade while the water repellency on the wiped windshield surface remains. Wipe quality is typically graded from a scale of 1 to 10, as defined, for example, by Akron Rubber Development Laboratory (ARDL), Inc.

Table 1 lists the major components of an embodiment of the inventive WR coating composition that resists absorption into rubber materials.

TABLE 1

Water Repellant Composition

| Ingredient | Typical total weight percent (%) | Preferred total weight percent (%) |
| --- | --- | --- |
| Quaternary Ammonium silicone salt | 0.5-75 | 5-60 |
| Mineral spirits | 0-50 | 0-20 |
| Solid Lubricant | 0-30 | 0-10 |
| Plasticizer | 0-50 | 0-25 |
| Solvent | remainder | remainder |

It is appreciated that an inventive coating on an applicator represents a dried version of the composition that has lost most if not all of the solvent and in some instances mineral spirits through volatilization so as to be composed of the salt, particulate, additives and in some instances residual solvent and/or mineral spirits.

The present invention is further detailed with respect to the following nonlimiting examples. These examples are not intended to limit the scope of the invention but rather highlight properties of specific inventive embodiments and the superior performance thereof relative to comparative examples.

EXAMPLES

Example 1

The coating composition of 50 total weight percent of a quaternary ammonium chloride silane, 30 total weight percent isopropanol, 15 total weight percent mineral spirits, 5 total weight percent of graphite powder with 90% particle size smaller or equal to 100 microns, and the remainder being isopropanol is applied to silicone rubber squeegees which were stored at 60° C. or room temperature for various periods of time before being evaluated for ability to transfer the water repellant (WR) property as measured by the water contact angle of the wiped windshield surface, from the coated blade to the windshield using a vehicle windshield and its wiper system under wet conditions. As illustrated in the chart of FIG. 2, the water contact angle data is collected on the windshield surface and is plotted versus the number of abrasion cycles of the wiper blade.

Figure 2:
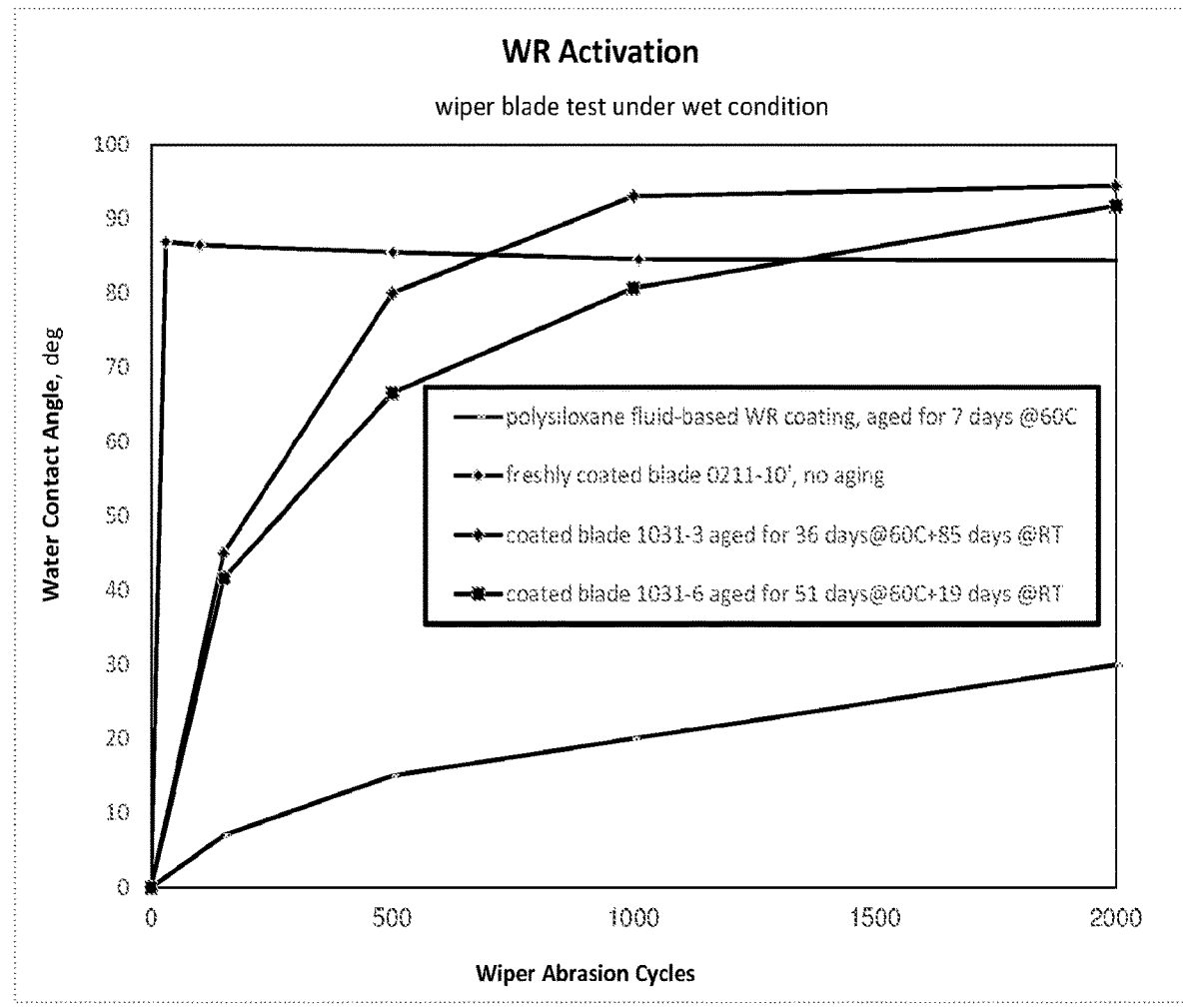
FIG. 2 is a plot of water repellency activation plotted as water contact angle in degrees as a function of wiper blade cycles for an inventive composition as disclosed in the present invention for wiper blades made of a selected silicone rubber in comparison with the same selected silicone rubber coated with a polysiloxane fluid based water repellent.

The plotted results of FIG. 2 indicate that the conventional, polysiloxane fluid-based WR coating applied on a silicone rubber squeegee that is lightly aged is not able to cause the windshield surface to become hydrophobic to the degree that the water contact of the wiped surface is at least 60 degrees, which is the minimal value to be considered beneficial to the driving vision improvement under raining conditions. In comparison, a silicone rubber squeegee coated with an embodiment of the inventive coating composition is able to make (activate) the windshield surface hydrophobic rapidly, regardless of whether the coated squeegee is fresh or has been aged for an extended time equivalent to two years at the ambient condition (20° C.).

The coated wiper squeegee that was aged at 60° C. for 36 days and then at room temperature for 85 days is predicted to have a shelf life equal to or greater than 661 days if stored under the ambient condition, and the coated wiper squeegee that was aged at 60° C. for 51 days and then at room temperature for 19 days is predicted to have a shelf life equal to or greater than 835 days if stored under the room temperature ambient conditions.

Example 2

Figure 3:
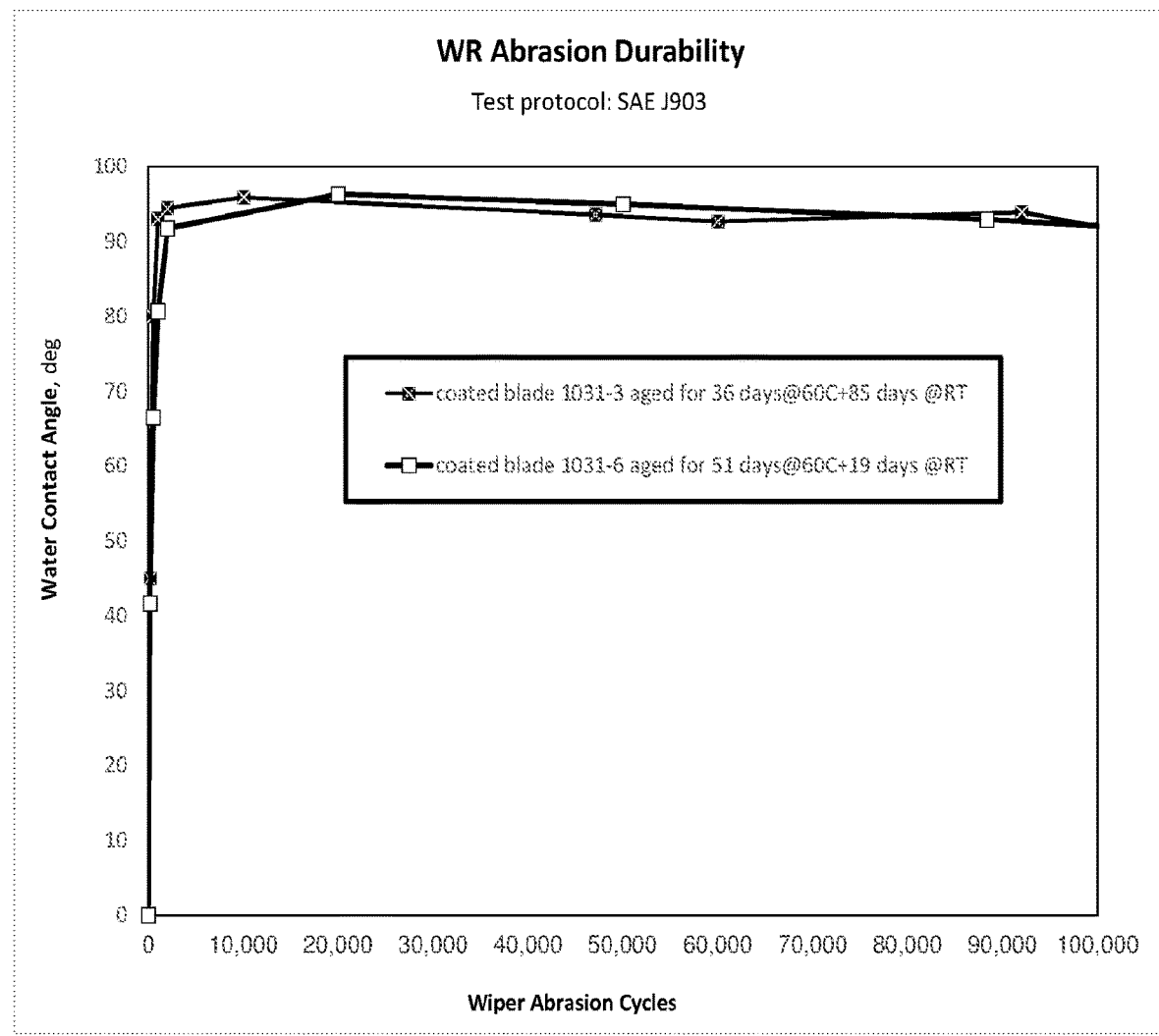
FIG. 3 is a plot of water repellency abrasion durability plotted as water contact angle in degrees as a function of wiper blade cycles for coated silicone-rubber wiper blades aged for 36 days at 60° C. and then stored at room temperature for 85 days; and for coated silicone-rubber wiper blades aged for 51 days at 60° C. and then stored at room temperature for 19 days.

A test is conducted under Society for Automotive Engineers (SAE) J903 to test the durability of the water repellant coating on a wiper squeegee with respect to storage length and ambient conditions. A first blade was coated with the inventive composition and is aged for 36 days at 60° C. and then at room temperature for 85 days. A second blade is aged for 51 days at 60° C. and then at room temperature for 19 days. As shown in FIG. 3, there is virtually no difference in the performance between the two treated blades over a range of 100,000 wiper blade cycles, and illustrates the robustness and outstanding longevity against wiper blade abrasion.

COMPARATIVE EXAMPLES

Commercially available CR-NR blended squeegees are coated with composition corresponding to Examples 1-3 of US2010/0234489 A1 and are aged at room temperature for about 3 months after production. The windshield WR tests show that these coatings are not able to activate the windshield to a water CA of more than 80 degrees. The water repellency of the wiped area is observed to not be uniform, indicative that the wiped area of the windshield is not fully activated.

Patents and publications mentioned in the specification are indicative of the levels of those skilled in the art to which the invention pertains. These patents and publications are incorporated herein by reference to the same extent as if each individual patent or publication is specifically and individually incorporated herein by reference.

The forgoing description is illustrative of particular embodiments of the invention but is not meant to be a limitation upon the practice thereof. The following claims, including all equivalents thereof are intended to define the scope of the invention.

The invention claimed is:

1. A process of forming a hydrophobic coating on a windshield comprising:
    providing a hydrophobic coating composition comprising a quaternary ammonium silane salt and a solvent comprising mineral spirits;
    applying the hydrophobic coating composition to a wiper blade insert;
    evaporating the mineral spirits to form a non-volatile layer on the wiper blade insert, the non-volatile layer having a thickness of between 0.5 and 500 microns; and
    subsequently transferring the hydrophobic coating composition from the wiper blade insert to the windshield by wiping under wet, dry, or a combination of wet and dry conditions to impart a water repellency of more than 60 degrees of water contact angle to the windshield within 2000 wipe cycles.

2. The process of claim 1 wherein the wiper blade insert is a hydrophobic elastomeric substrate.

3. The process of claim 1 wherein the hydrophobic coating composition further comprises a solid lubricant.

4. The process of claim 1 wherein the quaternary ammonium silane salt is a quaternary ammonium chloride silane.

5. The process of claim 1 wherein the quaternary ammonium silane salt is present from 0.5 to 75 total weight percent.

6. The process of claim 1 wherein the solvent is present from 25 to 99.5 total weight percent.

7. The process of claim 2 wherein the hydrophobic elastomeric substrate is selected from the group consisting of chloroprene rubber, natural rubber, silicone, and combinations thereof.

8. The process of claim 2 wherein the non-volatile layer is applied to both sides of a wiping lip of the hydrophobic elastomeric substrate in an amount ranging from 0.001 to 0.1 g per centimeter length per side.

9. The process of claim 3 wherein the solid lubricant is graphite powder.

* * * * *